United States Patent
Kwon et al.

(10) Patent No.: US 10,315,125 B2
(45) Date of Patent: Jun. 11, 2019

(54) MOTION CHAIR AND MOTION CHAIR CONTROL SYSTEM

(71) Applicant: CJ 4DPLEX CO., LTD., Seoul (KR)

(72) Inventors: Hyuk Ju Kwon, Gimpo-si (KR); Myung Chul Kim, Seoul (KR); Hyun Park, Seongnam-si (KR); Hyung Jin Tak, Seoul (KR)

(73) Assignee: CJ 4DPLEX CO., LTD., Seoul (KR)

( * ) Notice: Subject to any disclaimer, the term of this patent is extended or adjusted under 35 U.S.C. 154(b) by 0 days.

(21) Appl. No.: 15/539,535

(22) PCT Filed: Dec. 29, 2015

(86) PCT No.: PCT/KR2015/014376
§ 371 (c)(1),
(2) Date: Jun. 23, 2017

(87) PCT Pub. No.: WO2016/108559
PCT Pub. Date: Jul. 7, 2016

(65) Prior Publication Data
US 2018/0117491 A1    May 3, 2018

(30) Foreign Application Priority Data
Dec. 30, 2014  (KR) .................. 10-2014-0193635

(51) Int. Cl.
*A63J 25/00* (2009.01)
*A47C 1/12* (2006.01)
(Continued)

(52) U.S. Cl.
CPC ................ *A63J 25/00* (2013.01); *A47C 1/12* (2013.01); *G06F 3/016* (2013.01); *G08C 19/00* (2013.01); *A63J 2005/002* (2013.01)

(58) Field of Classification Search
CPC .......... A63G 4/00; A63G 31/00; A63G 31/16; A47C 3/00; A47C 3/0257; A47C 7/62;
(Continued)

(56) References Cited

U.S. PATENT DOCUMENTS

2001/0003102 A1* 6/2001 Shiina .................... A63G 31/16
                                                         472/60
2006/0135271 A1* 6/2006 Casey ...................... A63G 4/00
                                                         472/59
(Continued)

FOREIGN PATENT DOCUMENTS

CN    1183734 A    6/1998
CN    1178133 A    12/2004
(Continued)

OTHER PUBLICATIONS

International Search Report for PCT/KR2015/014376 dated Apr. 12, 2016.
Chinese Office Action dated Oct. 8, 2018, issued in corresponding Chinese Patent Application No. 201580069815.8.

*Primary Examiner* — Kien T Nguyen
(74) *Attorney, Agent, or Firm* — Hauptman Ham, LLP

(57) ABSTRACT

The present invention relates to a motion chair included in a 4D theater and a motion chair control system for controlling a plurality of the motion chairs. More specifically, the present invention relates to a motion chair, including a control unit configured to receive control data from an operating server and selectively control some or all of effect device control units, the effect device control units configured to correspond to one or more effect devices and to independently control corresponding effect devices under the control of the control unit, and the effect devices for implementing special effects, and a system for controlling the motion chairs.

11 Claims, 2 Drawing Sheets

(51) Int. Cl.
*G08C 19/00* (2006.01)
*G06F 3/01* (2006.01)
*A63G 31/16* (2006.01)
*A63J 5/00* (2006.01)

(58) Field of Classification Search
CPC ......... A63F 13/00; G06Q 50/10; G06F 3/048; G06F 9/445
USPC ....... 472/59–61, 130; 434/29, 34, 55; 462/1, 462/7; 463/1, 7
See application file for complete search history.

(56) References Cited

U.S. PATENT DOCUMENTS

2011/0031788 A1\* 2/2011 Kosik .................. A47C 3/0257
297/217.3
2015/0157951 A1\* 6/2015 Lee ........................ A63G 31/16
472/130

FOREIGN PATENT DOCUMENTS

| JP | 2002-239265 A | 8/2002 |
| KR | 10-2003-0002068 A | 1/2003 |
| KR | 10-2013-0091806 A | 8/2012 |
| KR | 10-1220632 B1 | 1/2013 |
| KR | 10-2013-0053504 A | 5/2013 |
| KR | 10-2013-0088282 A | 8/2013 |

\* cited by examiner

[Fig. 1]
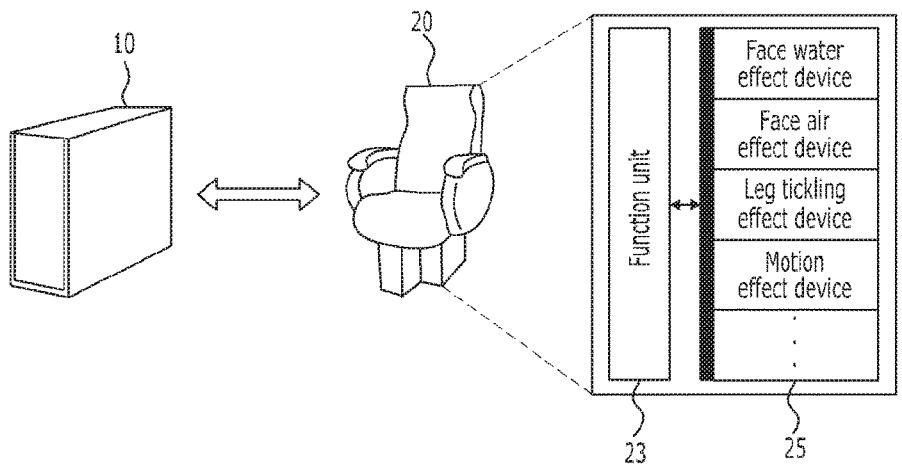
[Fig. 2]
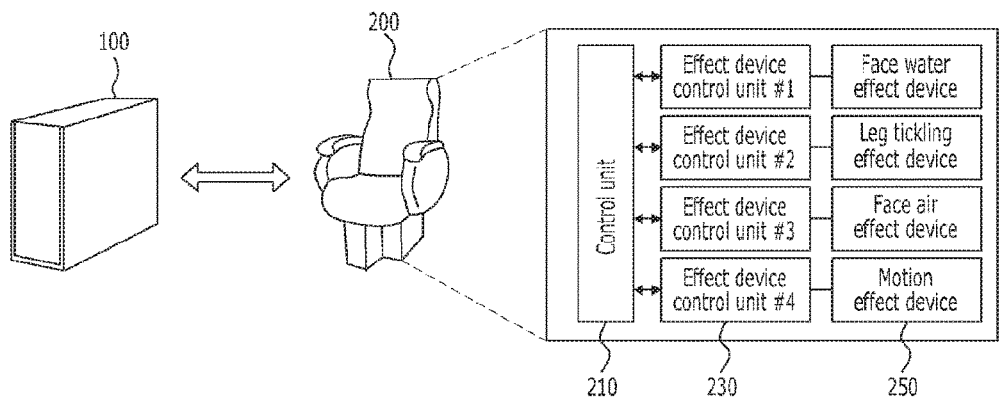
[Fig. 3]
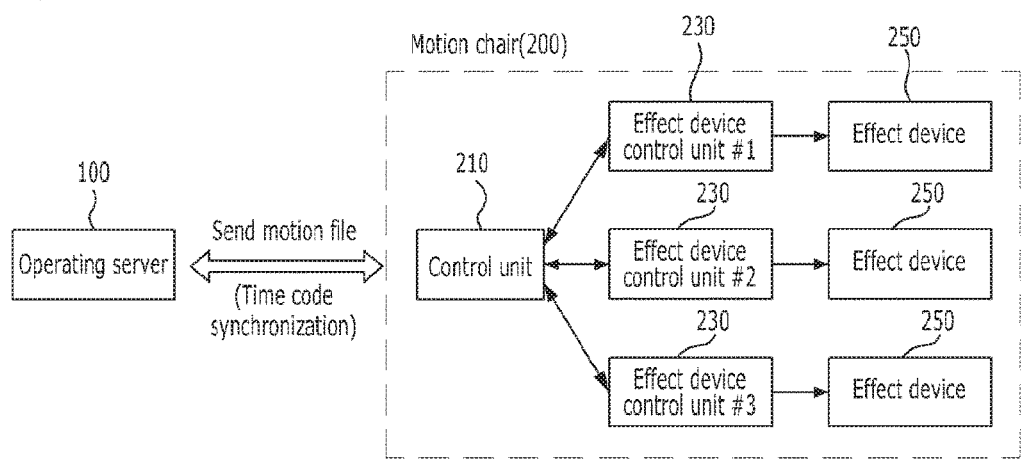

[Fig. 4]
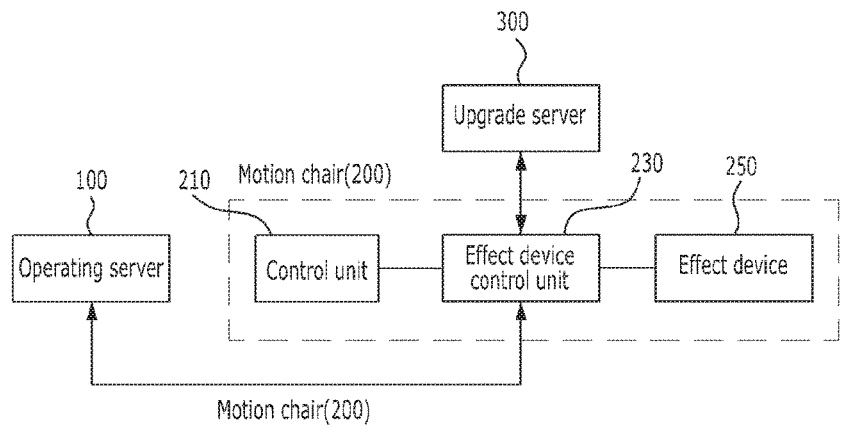
[Fig. 5]
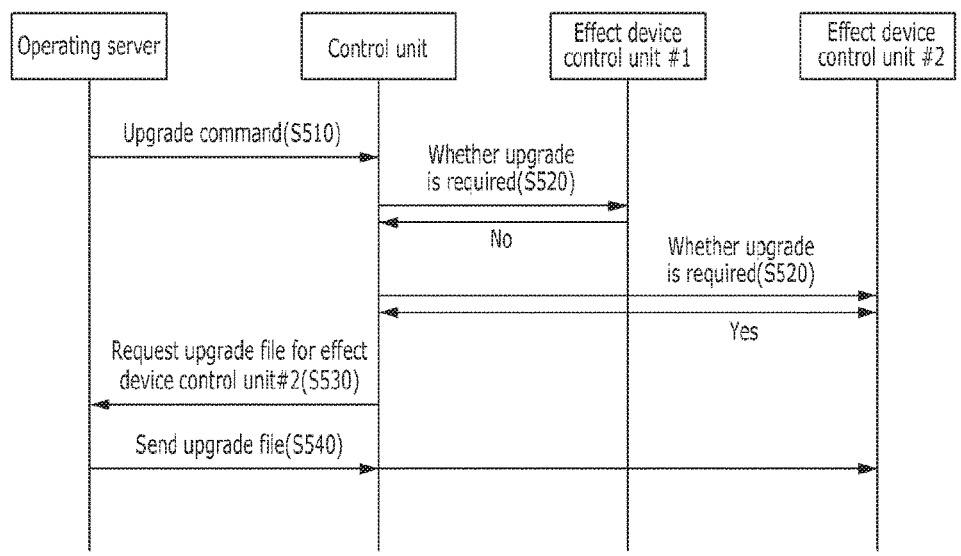
[Fig. 6]
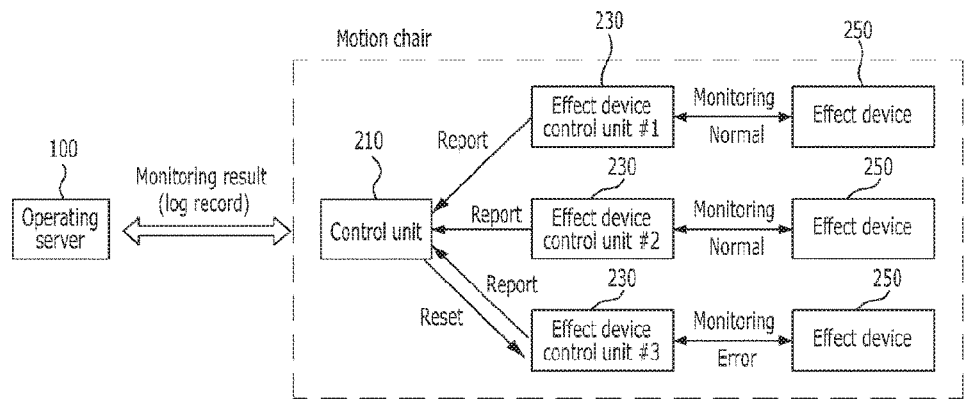

MOTION CHAIR AND MOTION CHAIR CONTROL SYSTEM

CROSS REFERENCE TO RELATED APPLICATION

This present application is a national stage filing under 35 U.S.C. § 371 of PCT application number PCT/KR2015/014376 filed on Dec. 29, 2015 which is based upon and claims the benefit of priority to Korean Patent Application No. 10-2014-0193635 filed on Dec. 30, 2014 in the Korean Intellectual Property Office. The disclosures of the above-listed applications are hereby incorporated by reference herein in their entirety.

TECHNICAL FIELD

The present invention relates to a motion chair included in a 4D theater and a motion chair control system for controlling a plurality of the motion chairs. More particularly, the present invention relates to a motion chair, including a control unit configured to receive control data from an operating server and to selectively control some or all of effect device control units to be controlled, the effect device control units configured to correspond to one or more effect devices and to independently control corresponding effect devices under the control of the control unit, and the effect devices configured to implement special effects, and a system for controlling such a motion chair.

BACKGROUND ART

Recently, a theater, that is, the space in which an audience can watch movie content, is significantly advanced along with the diversification of the movie content. In particular, many theater operating entities greatly increase 4D theaters, that is, theaters to which physical effects have been added, further to 3D stereoscopic screens.

The 4D theater may include various watching elements. A motion chair that belongs to the various watching elements and that enables an audience to directly experience a movement synchronized with an image may be said to be an essential element of the 4D theater.

In general, several tens of or several hundreds of motion chairs are installed in a single theater. Recently, there is a growing interest in a methodology for easily controlling a plurality of the motion chairs. In particular, from the point of view of an operator who manages a theater, if a plurality of the motion chairs is easily controlled, costs, such as a maintenance cost and personal expenses, can be reduced. Furthermore, if software responsible for overall control of the motion chairs is to be upgraded or if an error generated in a specific one of effect devices embedded in a motion chair is to be monitored or reset, such software update and such an error can be handled easily and rapidly. Accordingly, a need for a methodology for easily controlling a plurality of the motion chairs is gradually increasing.

In particular, in a recent situation in which the number of effect device is gradually increased and the driving of a motion chair becomes complicated, such as that a special effect for content in the motion chair is gradually diversified, a need for a method for controlling the motion chair more efficiently and such a control system is increasing.

The present invention is an invention relating to a system capable of efficiently controlling a plurality of motion chairs included in a theater as described above and the motion chair itself. The present invention has been invented to satisfy the aforementioned technical needs and to provide additional technical elements which cannot be easily invented by those skilled in the art to which the present invention pertains.

DISCLOSURE OF INVENTION

Technical Problem

An object of the present invention is to provide a system for effectively controlling a plurality of motion chairs included in a 4D theater and each of the motion chairs of the system.

In particular, an object of the present invention is to provide a system configured to include a plurality of effect device control units for controlling a plurality of effect devices, respectively, within each of motion chairs and a control unit for controlling the plurality of effect device control units, so that each of the motion chairs is controlled for each detailed device not all the detailed devices.

Furthermore, an object of the present invention is to minimize necessary processes for other effect devices by upgrading only an effect device that needs to be upgraded when upgrading control software of a motion chair.

Furthermore, an object of the present invention is to enable an operator to check the malfunction state of a motion chair in detail in such a manner that each of effect device control units monitors that a problem has been generated in which effect device and reports the generated problem in checking the malfunction state of the motion chairs.

Furthermore, an object of the present invention is to enable more efficient handling by resetting only a corresponding effect device control unit and/or effect device in which an error has occurred in handling a motion chair whose malfunction state has been checked.

Solution to Problem

A motion chair according to an embodiment of the present invention includes a control unit configured to selectively control some or all of a plurality of effect device control units, the plurality of effect device control units configured to correspond to one or more effect devices and to drive corresponding effect devices under the control of the control unit, and the plurality of effect devices each configured to include a device for implementing a special effect and driven under the control of the effect device control units.

Furthermore, the control unit of the motion chair receives a motion file including a motion schedule from an operating server. The control unit controls each of the effect device control units based on the motion file.

Furthermore, the control unit of the motion chair receives a time code synchronization command from the operating server and performs time code synchronization with the operating server in response to the time code synchronization command.

In this case, after performing the time code synchronization, the control unit shares synchronized time code with each of the effect device control units.

Furthermore, in the motion chair, each of the effect device control units accesses an upgrade server every predetermined cycle, determines whether upgrade is necessary or not, and downloads an upgrade file if it is determined that the upgrade is necessary.

Furthermore, in the motion chair, the control unit receives an upgrade command from the operating server, determines whether each of the effect device control units needs to be upgraded, and requests an upgrade file for an effect device control unit which needs to be upgraded from the operating server.

Furthermore, in this case, the control unit receives the upgrade file from the operating server and transfers the upgrade file to the effect device control unit which needs to be upgraded. The effect device control unit performs upgrade based on the upgrade file.

Furthermore, in the motion chair, each of the effect device control units monitors the operating state of each of the effect devices and sends a result of the monitoring to the control unit.

In this case, the control unit receives the result of the monitoring and resets only abnormal effect device control units.

A motion chair control system according to an embodiment of the present invention includes motion chairs each configured to include a plurality of effect devices, to receive control data from an operating server, and to selectively control some or all of the plurality of effect devices based on the control data and an operating server configured to generate the control data for controlling the effect devices of the motion chairs and to send the generated control data to one or more of the motion chairs.

In the motion chair control system, the control data includes a motion file including a motion schedule associated with specific content. The motion chair is controlled based on the motion file.

In the motion chair control system, the motion file includes a motion schedule for selectively controlling some or all of the effect devices of the motion chair. The motion chair selectively controls some or all of the plurality of effect devices based on the motion file.

Furthermore, in the motion chair control system, the control data includes a time code synchronization command. The motion chair performs time code synchronization with the operating server in response to the time code synchronization command.

Furthermore, in the motion chair control system, the control data includes an effect device check command. The motion chair checks some or all of the plurality of effect devices in response to the effect device check command and sends a result report to the operating server.

Furthermore, in the motion chair control system, the control data includes an upgrade command. The motion chair determines whether some or all of the plurality of effect devices need to be upgraded in response to the upgrade command and requests an upgrade file for an effect device which needs to be upgraded.

In this case, the operating server sends the upgrade file for the effect device which needs to be upgraded to the motion chair. The motion chair upgrades only the effect device which needs to be upgraded.

Advantageous Effects of Invention

In accordance with the present invention, the plurality of motion chairs included in a 4D theater can be effectively controlled. In particular, each of the effect devices can be controlled without using a conventional method for generally controlling all the effect devices. Accordingly, there is an advantage in that rapid and efficient control is possible because unnecessarily transmitted and received data and unnecessary process steps are reduced.

In particular, in accordance with the present invention, there is an advantage in that each of the effect devices can be easily updated because each of the effect device control units included in the motion chair can autonomously update control software.

Furthermore, in accordance with the present invention, there is an advantage in that the operating state of each of the effect devices can be checked in more detail because each of the effect device control units can autonomously monitor and report the operating state of each of the effect devices.

Furthermore, in accordance with the present invention, there are advantages in that only a specific effect device control unit can be reset when a malfunction is generated in a specific effect device of the motion chair and thus audience inconvenience can be minimized because all the motion chairs do not need to be reset.

BRIEF DESCRIPTION OF DRAWINGS

FIG. 1 shows a conventional motion chair control system.

FIG. 2 shows a motion chair control system and the detailed elements of a motion chair according to an embodiment of the present invention.

FIG. 3 shows a process for receiving, by the motion chairs, a motion file from an operating server and controlling respective effect devices using the motion file in accordance with an embodiment of the present invention.

FIGS. 4 and 5 show a process for performing, by each motion chair, upgrade for each effect device control unit according to an embodiment of the present invention.

FIG. 6 shows a process for performing, by each motion chair, monitoring on each effect device and a process for resetting an effect device in which an operational error has occurred in accordance with an embodiment of the present invention.

MODE FOR THE INVENTION

The objects and technical configurations of the present invention and the details of acting effects thereof will become more clearly understood from the following detailed description based on the accompanying drawings. Hereinafter, embodiments of the present invention are described in detail with reference to the accompanying drawings.

The embodiments disclosed in this specification should not be interpreted or used as limiting the scope of the present invention. It is evident to those skilled in the art that a description including the embodiments of this specification may have various applications. Accordingly, some embodiments of the present invention described in the detailed description of the present invention are illustrative for better understanding, and the scope of the present invention is not intended to be limited to the embodiments.

Functional blocks illustrated in the drawings and described below are only examples of possible implementations. In other implementations, different functional blocks may be used without departing from the spirit and scope of the detailed description. Furthermore, although one or more functional blocks of the present invention are illustrated as separate blocks, one or more of the functional blocks of the present invention may be a combination of various hardware and software elements executing the same function.

Furthermore, it should be understood that an expression that some elements are "included" is an expression of an "open type" and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

A conventional method of controlling, by an operator, a motion chair is described below with reference to FIG. 1.

Referring to FIG. 1, a conventional motion chair control system includes an operating server 10, that is, an operating entity, and a plurality of motion chairs 20 included in a theater. In this case, each of the motion chairs 20 includes a function unit 23 for driving devices for internally implementing actual special effects, that is, a plurality of effect devices 25. A program, that is, firmware necessary to control the effect devices 25, is installed in the function unit 23. In general, firmware is written in a storage space within the function unit 23, more specifically, in ROM. The firmware includes a control command for all the effect devices of the motion chair 20. The function unit 23 in which such firmware has been installed receives a control command from the operating server 10 and controls each of the effect devices 25 using the firmware.

In order to effectively drive the various effect devices 25 of the motion chair 20, a program, that is, firmware necessary to control the various effect devices 25, needs to be upgraded. In a conventional system, such as that of FIG. 1, the operating server 10 sends an upgrade file, and the function unit 23 receives the upgrade file and upgrades the firmware.

However, a conventional system in which a single piece of firmware has a control right to all the effect devices, that is, in which pieces of firmware have been unified, is problematic in that only the driving aspect of any one of the effect devices 25 needs to be upgraded, but all the pieces of firmware have to be upgraded. In this case, data necessary to upgrade the pieces of firmware is huge. Accordingly, the time taken for upgrade continues to be delayed, and there is a difficulty in managing a huge upgrade file from the point of view of a person who produces the upgrade file. Such problems may result in poor production of firmware and poor control of a motion chair.

There is a problem in monitoring the operating state of each of the motion chairs 20 and checking whether an operational error is present or not in the case of a conventional control system, such as that of FIG. 1, in addition to the upgrade of firmware. That is, in the conventional system, the function unit 23 of each of the motion chairs 20 monitors the operating state of the effect devices 25 and notifies the operating server 10 of an operational error when the error is generated. In this case, information provided from the function unit 23 to the operating server 10 includes only information about what abnormality has occurred in the motion chair 20, but does not include detailed information, such as that what type of an error has occurred in which one of the effect devices 25 of the motion chair 20.

Moreover, after receiving a report regarding that an error is present in the operating state of the motion chair 20, the operating server 10 sends a reset command to the function unit 23 in order to solve the error. However, there is a problem in that the operating server 10 has to reset the function unit 23 and the firmware, that is, the entire motion chair 20 including all the effect devices 25, because it is unable to be aware that abnormality is present in which one of the effect devices 25.

In particular, the task for resetting the motion chair 20 may cause great inconvenience when an operational error occurs while audiences watch 4D content. In this case, there is a problem in that the audiences are not provided with the special effects of the remaining effect devices 25 due to an error of some effect devices 25.

The present invention has been intended to improve such as a conventional motion chair control system. A motion chair and a motion chair control system according to embodiments of the present invention are described below with reference to FIG. 2.

Referring to FIG. 2, a motion chair control system according to an embodiment of the present invention basically includes a plurality of motion chairs 200 and an operating server 100. The motion chair control system according to an embodiment of the present invention is similar to the conventional motion chair control system of FIG. 1 in terms of a macroscopic configuration, but is different from the conventional motion chair control system in the detailed elements of the motion chair 200. The detailed elements of the motion chair 200 are described in detail below.

First, each of the motion chairs 200 according to an embodiment of the present invention includes a plurality of effect devices 250 and selectively controls some or all of the plurality of effect devices 250. That is, the motion chair 200 according to an embodiment of the present invention does not generally control all the effect devices 250 as in the prior art, but selectively controls some or all of the effect devices 250.

For such selective control, the motion chair 200 according to an embodiment of the present invention includes a control unit 210, the plurality of effect device control units 230, and the plurality of effect devices 250.

The control unit 210 is connected to the plurality of effect device control units 230 of the motion chair 200, and may send and receive data to and from each of the effect device control units 230. The most important function of the control unit 210 is to selectively control some or all of the plurality of effect device control units 230. That is, the control unit 210 selectively controls the effect device control units 230 so that the effect devices 250 are individually upgraded, monitored, and reset.

Furthermore, the control unit 210 may further include an external server, for example, the operating server 100 and an upgrade server 300 (see FIG. 4) or a communication unit capable of data communication with other external servers.

The motion chair 200 according to an embodiment of the present invention includes the plurality of effect device control units 230. The effect device control units 230 correspond to the respective effect devices 250 and drive the respective effect devices 250 under the control of the control unit 210.

For example, assuming that the motion chair 200 includes a first effect device 250 and a second effect device 250, the motion chair 200 includes a first effect device control unit 230 and a second effect device control unit 230 respectively corresponding to the first and the second effect devices 250.

As will be described later, the effect device control unit 230 may function independently of the control unit 210 because it includes control software in itself. The effect device control unit 230 may send and receive data to and from an external server independently of the control unit 210 according to circumstances.

Each of the effect devices 250 of the motion chair 200 includes a device for implementing a special effect while operating in conjunction with 4D content and is driven under the control of the effect device control units 230.

The effect devices 250 may include a motion device for implementing a variety of types of movements of the motion chair 200, a spray device for implementing water spray, a fan device for generating the wind, a vibration device for generating vibration, and a tickling device for generating a tactile sense to part of the human body of an audience.

The basic elements of the motion chair 200 have been described above. Each of the motion chairs 200 according to an embodiment of the present invention functions independently. In particular, unlike in the prior art, the motion chair 200 may control (e.g., motion control, upgrade, monitoring, and reset) each of the effect devices 250 using the plurality of effect device control units 230.

The operating server 100 generates control data for controlling the effect devices 250 of the motion chairs 200 and sends the generated control data to one or more of the motion chairs 200.

The operating server 100 is managed by an entity which manages a 4D theater, and sends control data to each of the motion chairs 200 according to circumstances.

The control data generated by the operating server 100 does not necessarily mean only the motion schedule of the motion chair 200 associated with the screening of content, for example, the driving of the motion chair 200, such as vibration, a movement, spray, and the generation of the wind, but should be understood to include all of commands for generally controlling the detailed elements of the motion chair 200, that is, the control unit 210, the effect device control units 230, the effect devices 250, such as a time code synchronization command, an upgrade command, and a command for checking the effect devices 250 as described above.

Furthermore, in the relationship between the operating server 100 and the motion chair 200, the motion chair 200 does not operate based on only the control data of the operating server 100, that is, a control command, but may independently function although there is no control data received from the operating server 100.

Embodiments of the motion chair 200 according to the present invention are described below.

Embodiment 1—Motion Control of the Motion Chair 200

FIG. 3 shows a process of implementing, by the motion chair 200 according to an embodiment of the present invention, a motion while operating in conjunction with 4D content.

Referring to FIG. 3, first, the control unit 210 receives a motion file from an external server, more specifically, the operating server 100. The motion chair 200 according to an embodiment of the present invention may further include a separate storage unit for storing a motion file received from the outside.

The motion file refers to a data file in which the schedule of motions to be implemented in association with 4D content has been written. The aspect, start time, and duration of each of motions to be implemented by the respective effect devices 250 are written in a corresponding motion file. For example, whether the motion chair 200 will be driven according to which one of aspects: roll, pitch, yaw, heave, sway, and surge, how much will the motion angle of the motion chair 200 be when the motion chair 200 moves in a specific direction, how fast will the motion chair 200 be driven, when the motion chair 200 will be driven in the entire running time, and how long (e.g., seconds) will the motion chair 200 be driven may be written in the motion file.

The motion file may include all the motion schedules of the plurality of effect devices 250 in a single data form. In some embodiments, the motion file may include only the motion schedule of each effect device 250. In the former case, the control unit 210 extracts the motion schedules of the respective effect devices 250 included in a single motion file and controls the plurality of effect device control units 230 based on the motion schedules. In the later case, the control unit 210 receives a plurality of motion files and controls the plurality of effect device control units 230 based on the respective motion files.

Referring to FIG. 3, the control unit 210 of the motion chair 200 receives a motion file from the operating server 100 and controls the effect device control units 230 for managing a face water effect device 250e, a face air effect device 250, and a leg tickling effect device 250, respectively, based on the motion file.

The motion chair 200 according to an embodiment of the present invention may further perform a process for synchronizing time code in order to communicate with the operating server 100 in real time while 4D content is screened. That is, when the screening of 4D content is started, the operating server 100 and the motion chair 200 perform time code synchronization in order to make time information, referred by the operating server 100, identical with time information referred by the motion chair 200. Accordingly, although an unexpected variable is generated, such as if the motion chair 200 is to be separately controlled while content is screened or if the motion chair 200 is to be reset due to the generation of a sudden error, the operating server 100 may take proper measures on a proper time with reference to time code shared with the motion chair 200.

Embodiment 2—Upgrade of Each Effect Device Control Unit

The motion chair 200 according to an embodiment of the present invention may upgrade each of the effect device control units 230, more specifically, control software included in each of the effect device control units 230. An upgrade method may be performed according to two methods as follows.

In the first upgrade method, each of the effect device control units 230 of the motion chair 200 periodically accesses an external upgrade server 300 and upgrades control software included therein. In this case, the upgrade server 300 does not necessarily mean a server separated from the operating server 100, and the operating server 100 may directly provide an upgrade file to each of the effect device control units 230. The cycle of the access may be properly controlled based on each of the effect device control units 230 or may be generally controlled for all of the effect device control units 230.

For example, in the motion chair 200, the first effect device control unit 230 for controlling the face water effect device 250 may be implemented to access the external upgrade server 300 once every 24 hours and to check whether control software included in the first effect device control unit 230 needs to be upgraded or not. Whether control software needs to be upgraded or not is performed by comparing the version of control software included in the first effect device control unit 230 with control software stored in the upgrade server 300.

If, as a result of the comparison, the control software of the first effect device control unit 230 needs to be upgraded because the version of control software of the upgrade server 300 is higher than that of the first effect device control unit 230, the first effect device control units 230 downloads the control software of a corresponding version and upgrades its control software. If, as a result of the comparison, the control software of the first effect device control unit 230 does not need to be upgraded, the first effect device control unit 230 releases the access to the upgrade server 300.

An implementation aspect of the face water effect device 250 can be improved through the upgrade of control software. For example, the first effect device control unit 230 may control an implementation aspect of the face water effect device 250 which may be controlled in software, such as that pressure when water is sprayed by the face water effect device 250 is controlled or that the amount of water sprayed by the face water effect device 250 is controlled.

In the second upgrade method, each of the effect device control units 230 receives an upgrade command and an upgrade file from the operating server 100 and upgrades control software installed therein. FIG. 5 shows the process of the second upgrade method in order.

The operating server 100 may send an upgrade command to each of the motion chairs 200. In this case, the upgrade command is received through the control unit 210 of the motion chair 200 at step S510.

The control unit 210 checks whether each of the effect device control units 230 needs to be upgraded or not in response to the upgrade command at step S520. Whether each of the effect device control units 230 needs to be upgraded or not is performed by comparing version information, included in the upgrade command received by the control unit 210, with the version of control software of each of the effect device control units 230.

After checking effect device control units 230 that need to be upgraded, the control unit 210 requests an upgrade file for only the effect device control units 230 from the operating server 100 at step S530. The control unit 210 downloads the upgrade file and transfers it to the effect device control units 230 so that the effect device control units 230 are upgraded at step S540. In some embodiments, the control unit 210 may allow the effect device control units 230 that need to be upgraded to directly access the operating server 100 or the upgrade server 300 so that the effect device control units 230 are upgraded.

Embodiment 3—Monitoring and Reset

The motion chair 200 according to an embodiment of the present invention may monitor each of the effect devices 250 and may solve a problem by resetting an effect device control unit 230 corresponding to an effect device 250 in which an operational error has occurred.

First, regarding monitoring, the control unit 210 receives a plurality of reports regarding whether the plurality of effect devices 250 corresponding to the respective effect device control units 230 normally operate from the plurality of effect device control units 230 and transfers the received reports to the operating server 100.

Each of the plurality of effect device control units 230 checks whether each of the effect devices 250 normally operates or not. In this case, the check includes simply checking whether a corresponding effect device 250 now operates or not and may include checking that an operational error has been generated in which part of the effect device 250 if the operational error has occurred and checking error code regarding the cause of the operational error. That is, the effect device control unit 230 may check the detailed cause of an operational error when the operational error occurs in a corresponding effect device 250 and share corresponding information with the control unit 210 to the operating server 100. From the point of view of the control unit 210 or the operating server 100, there is an advantage in that more accurate follow-up measures can be taken based on such detailed information.

If there is an effect device 250 in which an operational error has occurred, the control unit 210 or the operating server 100 may issue a reset command as measures against the corresponding effect device 250. In this case, the reset is performed on only a corresponding effect device control unit 230 that is problematic, and existing control continues to be performed on the remaining effect device control units 230 in which an operational error has not occurred.

That is, if, as a result of real-time monitoring, an operational error is detected in the face water effect device 250, the control unit 210 or the operating server 100 resets only the effect device control unit 230 for controlling the face water effect device 250 and does not reset the remaining face air effect device and leg tickling effect device.

If each of the effect device control units 230 is reset as described above, in particular, if some effect devices 250 are problematic and are reset while audiences watch 4D content, the audiences do not experience only the effects of the problematic effect devices 250, but can enjoy 4D content without great inconvenience because they still experience special effects provided by other effect devices. This may be said to be improved from the conventional method of resetting all the motion chairs 20 when abnormality occurs in any one of the effect devices 25 in controlling the motion chairs 20 through firmware.

Although some embodiments and applications of the present invention have been illustrated and described above, the present invention is not limited to the aforementioned specific embodiments and applications, and those skilled in the art to which the present invention pertains may modify the present invention in various ways without departing from the gist of the present invention written in the claims. Such modified embodiments should not be interpreted as being distinct from the technical spirit or prospect of the present invention.

The invention claimed is:

1. A motion chair, comprising:
   a control unit configured to selectively control a plurality of effect device control units, where the control unit controls a plurality of effect devices corresponding to the plurality of effect device control units respectively;
   the plurality of effect device control units configured to correspond to one or more effect devices and to drive corresponding effect devices under a control of the control unit by control software included independently in the plurality of effect device control units; and
   the plurality of effect devices each configured to comprise a device for implementing a special effect and driven under a control of the control software included in the effect device control units, where the plurality of effect devices each corresponds to the effect device control units,
   wherein the control unit receives an upgrade command from an operating server, determines whether each of the effect device control units needs to be upgraded, and requests an upgrade file for an effect device control unit which needs to be upgraded from the operating server, and
   wherein the control unit receives the upgrade file from the operating server and transfers the upgrade file to one of the effect device control units which needs to be upgraded, and the effect device control unit performs upgrade based on the upgrade file.

2. The motion chair of claim 1, wherein
the control unit receives a motion file comprising a motion schedule from an operating server, and
the control unit controls each of the effect device control units based on the motion file.

3. The motion chair of claim 1, wherein the control unit receives a time code synchronization command from an operating server and performs time code synchronization with the operating server in response to the time code synchronization command.

4. The motion chair of claim 3, wherein after performing the time code synchronization, the control unit shares synchronized time code with each of the effect device control units.

5. The motion chair of claim 1, wherein each of the effect device control units accesses an upgrade server every predetermined cycle, determines whether upgrade is necessary or not, and downloads an upgrade file if it is determined that the upgrade is necessary.

6. A motion chair, comprising:
a control unit configured to selectively control a plurality of effect device control units, where the control unit controls a plurality of effect devices corresponding to the plurality of effect device control units respectively;
the plurality of effect device control units configured to correspond to one or more effect devices and to drive corresponding effect devices under a control of the control unit by control software included independently in the plurality of effect device control units; and
the plurality of effect devices each configured to comprise a device for implementing a special effect and driven under a control of the control software included in the effect device control units, where the plurality of effect devices each corresponds to the effect device control units,
wherein each of the effect device control units monitors an operating state of each of the effect devices and sends a result of the monitoring to the control unit, and
wherein the control unit receives the result of the monitoring and resets only abnormal effect device control units.

7. A motion chair control system, comprising:
a plurality of motion chairs, wherein each of the plurality of motion chairs comprise a plurality of effect devices and a plurality of effect device control units corresponding to the plurality of effect devices respectively, and is configured to receive a control data, and to selectively control the plurality of effect device control units based on the control data so as to control the plurality of the effect devices respectively; and
an operating server configured to generate the control data for controlling the effect devices of the motion chairs and to send the generated control data to one or more of the motion chairs,
wherein the plurality of effect device control units controls corresponding effect devices via control software included in the effect device control units independently,
wherein the control data comprises an upgrade command, and the motion chair determines whether some or all of the plurality of effect devices need to be upgraded in response to the upgrade command and requests an upgrade file for an effect device which needs to be upgraded, and
wherein the motion chair, after receiving the upgrade file for the effect device which needs to be upgraded from the operating server, upgrades only the effect device which needs to be upgraded.

8. The motion chair control system of claim 7, wherein
the control data comprises a motion file comprising a motion schedule associated with specific content, and
the motion chair is controlled based on the motion file.

9. The motion chair control system of claim 8, wherein
the motion file comprises a motion schedule for selectively controlling some or all of the effect devices of the motion chair, and
the motion chair selectively controls some or all of the plurality of effect devices based on the motion file.

10. The motion chair control system of claim 7, wherein
the control data comprises a time code synchronization command, and
the motion chair performs time code synchronization with the operating server in response to the time code synchronization command.

11. A motion chair control system, comprising:
a plurality of motion chairs, wherein each of the plurality of motion chairs comprise a plurality of effect devices and a plurality of effect device control units corresponding to the plurality of effect devices respectively, and is configured to receive a control data and selectively control the plurality of effect device control units based on the control data so as to control the plurality of the effect devices respectively; and
an operating server configured to generate the control data for controlling the effect devices of the motion chairs and to send the generated control data to one or more of the motion chairs,
wherein the plurality of effect device control units controls corresponding effect devices via control software included in the effect device control units independently, and
wherein
the control data comprises an effect device check command, and
the plurality of motion chair checks some or all of the plurality of effect devices in response to the effect device check command and sends a result report to the operating server.

* * * * *